(12) United States Patent
Bejjani et al.

(10) Patent No.: US 6,430,166 B1
(45) Date of Patent: Aug. 6, 2002

(54) RECEIVER AND METHOD FOR CDMA TRANSMISSION WITH ENHANCED PATH SEARCHER

(75) Inventors: Elie Bejjani, Saint-Cloud; Alexandre Da Rocha, Puteaux; Jean-Hugues Perrin, Argenteuil, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/377,031

(22) Filed: Aug. 19, 1999

(30) Foreign Application Priority Data

Jun. 24, 1999 (EP) .............................. 99440160

(51) Int. Cl.$^7$ ................................ H04J 13/00
(52) U.S. Cl. .................. 370/320; 370/441; 375/267; 375/285; 455/214
(58) Field of Search .................. 370/320, 324, 370/335, 329, 341, 342, 441, 513, 517, 203, 206; 375/227, 267, 284, 285; 455/214, 222, 224

(56) References Cited

U.S. PATENT DOCUMENTS

| 5,671,221 A | * | 9/1997 | Yang ........................... 370/320 |
| 6,047,019 A | * | 4/2000 | Ishii ............................ 343/703 |
| 6,157,687 A | * | 12/2000 | Ono ............................ 370/335 |
| 6,208,683 B1 | * | 3/2001 | Mizuguchi et al. ......... 375/140 |

FOREIGN PATENT DOCUMENTS

| EP | 0 749 215 A2 | 12/1996 |
| EP | 0 884 857 A2 | 12/1998 |

* cited by examiner

*Primary Examiner*—Daniel Hunter
*Assistant Examiner*—Andrew Harry
(74) *Attorney, Agent, or Firm*—Sughrue Mion, PLLC

(57) ABSTRACT

Receiver for enhanced performance for CDMA radio transmission comprising a Rake receiver (1) with a path searcher (3), a channel estimator (4) and a combiner (5) for selecting optimal channels paths where the path searcher (3) selects a set of path delays (7) where at least two path searchers (3*a*,3*b*) are connected in way that the output of the first path searcher (3*a*) is linked to one input of the second path searcher (3*b*).

5 Claims, 3 Drawing Sheets

RECEIVER AND METHOD FOR CDMA TRANSMISSION WITH ENHANCED PATH SEARCHER

BACKGROUND OF THE INVENTION

Figure 1:
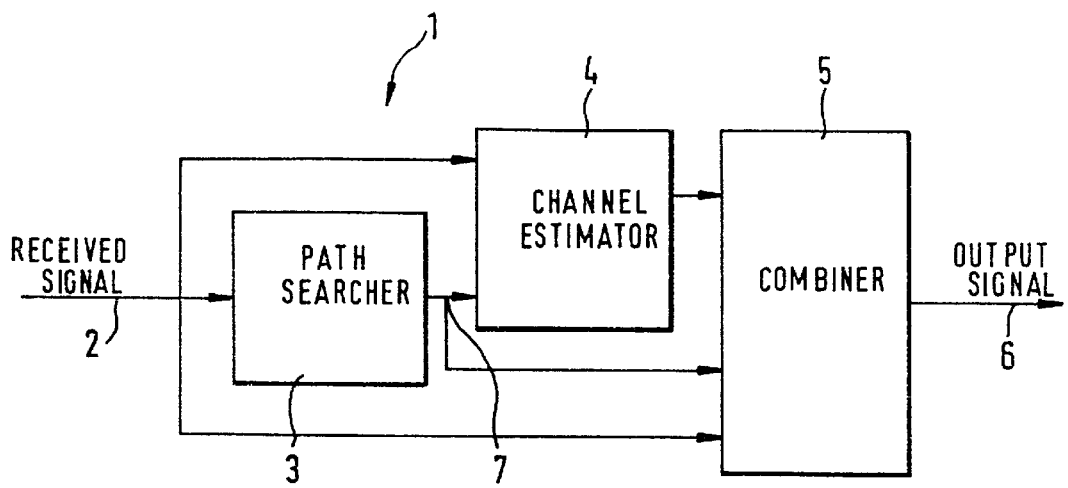

The invention relates to a receiver and a method for CDMA transmission with enhanced path searcher as described in the subject of the independent claims.

In terrestrial communication the transmitted signal is reflected and refracted by a variety of smooth or rough terrains, so that it is replicated at the receiver with several time delays. Each individual path also arrives at is own amplitude and carrier phase. Propagation characteristics are qualitatively the some for all structures of signals though they will vary quantitatively with carrier frequency and terrain characteristics. The structures of the individual propagation paths can be identified and possibly exploited only on the extent that they can be distinguished from one other. In particular spread spectrum signals employ pseudo random sequences with chip time Tc inversely proportional to the spreading bandwidth. In this case the individual paths can be distinguished if they mutually separated by delays greater than Tc for then the various delayed versions of the signal will be mutually uncorrelated.

The path amplitudes will depend on the relative propagation distances and the reflective or refractive properties of the area. However in many cases particularly in confined areas each of the distinguishable multi path components will actually be itself the linear combination of several indistinguishable paths of varying amplitudes. To exploit energy in the multiple components of multi path propagation they must be identifies and acquired. It is particularly important to determine the relative delays and subsequently when possible their amplitudes and phases. This can be performed even with fully modulated signals, but the estimate is much precise and resulting performance is much improved if the path identification and parameter estimation is performed on an unmodulated signal. Unmodulated segments can be inserted every so often in the modulated signal particularly with time division multiplexing. However in spread spectrum systems it is much more effective and easier to separate the unmodulated pilot signals from the data modulated signal by assigning it on individual pseudo random sequence.

A pilot sequence for determining multi path component characteristics is well justified for one-to-many transmission channels such as the forward down link from a base station to multiple users. The optimum demodulator structure for a L multi path propagation channel is known as Rake receiver. Each multi path component demodulator is called a "finger" of the rake. The pilot sequence tracking of a particular demodulator is started by time delay estimation of a given path as determined by the pilots sequences searcher. The demodulator forms the weighted phase-adjusted and delay-adjusted sum of L components.

In prior art the profile of the powers of each of the L paths is taken by checking the pilot sequence of one pilot channel on a slot by slot basis. This power profile is computed by noncoherent averaging of instantaneous channel profiles performed on this slot by slot basis. So the demodulator has to wait for the next pilot sequence in the next time slot to get more information to optimize the power profile.

For downlink mode the performance of this solution depends extremely on the signal to noise ratio of the pilot sequence. This means that the result of the demodulation in the receiver depends on the pilot sequence length itself and the distortions in the dedicated channel.

Moreover for high bitrate the correlation length is shorter because of the lower spreading factor of the signal. Thus for different bit rates performances of the path selection algorithm can be different. Within a CDMA receiver the selection of paths and delays of the transmission channel is needed in order to perform the channel estimation and data detection in presence of noise and interference. In a mobile terminal two different types of down link channels should be received: the dedicated channel DPCH carrying out user specific data and control information and common down link channels such as primary and secondary common control physical channels CCPCH, common pilot channel CPICH as well as synchronization channels. In principle the propagation conditions experienced by these two types of channels could be different, for example when the dedicated channels use antenna arrays that are not applicable for common channels. It should be noted that these common down link channels should not be used for channel estimation but only for path delay estimation. In fact fading processes are not the same on common control channels and dedicated channels when the latter are employing antenna array techniques.

In general the selection of channels paths is realized thanks to known pilot sequences included in each time slot of the considered physical channel.

Figure 2:
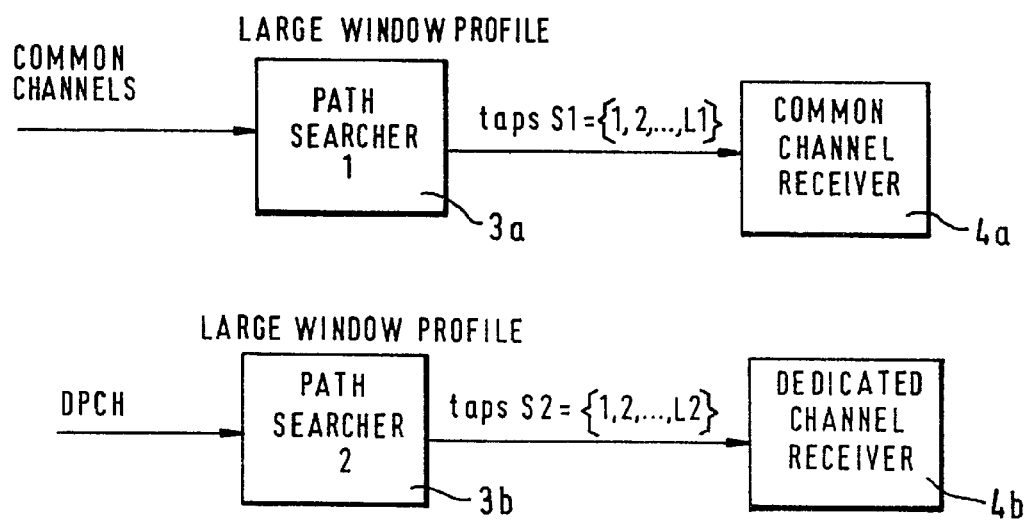

The path searcher need a power profile prior to the path selection operation. The power profile might be computed by noncoherent averaging of instantaneous channel profiles performed on a slot by slot basis. An adaptive thresholding is also applied on the power profile, to try separating the true propagation channels encountered. The classical solution is to perform independently path delay selection for dedicated and common channels as shown in FIG. 2.

This solution has two main drawbacks. The structure is complex because of doubling the whole structure. The performance of second path searcher (3b) is decreased by a poorer signal to noise ratio of dedicated channels in comparison to common channels that are transmitted at a sufficient level in order lo be well received by all mobile terminals within the cell.

To obtain a better performance of the second path searcher (3b) and at the same time reduce the computational complexity the proposed solution is to perform the two path searching operations in a joint manner.

SUMMARY OF THE INVENTION

The invention as described below increases performance of a demodulator in a CDMA receiver due to a cascading of path searchers and so to get an optimized channel profile.

The improvements are done by:

A receiver for enhanced performance for COMA radio transmission comprising a Rake receiver (1) with a path searcher (3), a channel estimator (4) and a combiner (5) for selecting optimal channels paths where the path searcher (3) selects a set of path delays (7), characterized in that at least two path searchers (3a,3b) are connected in way that the output of the first path searcher (3a) is connected to one input of the second path searcher (3b) that input limits the range of selection.

BRIEF DESCRIPTIONS OF THE DRAWINGS

A preferred embodiment of the invention is shown in the figures and described below.

FIG. 1 Receiver

FIG. 2 Prior art parallel structure

Figure 3:
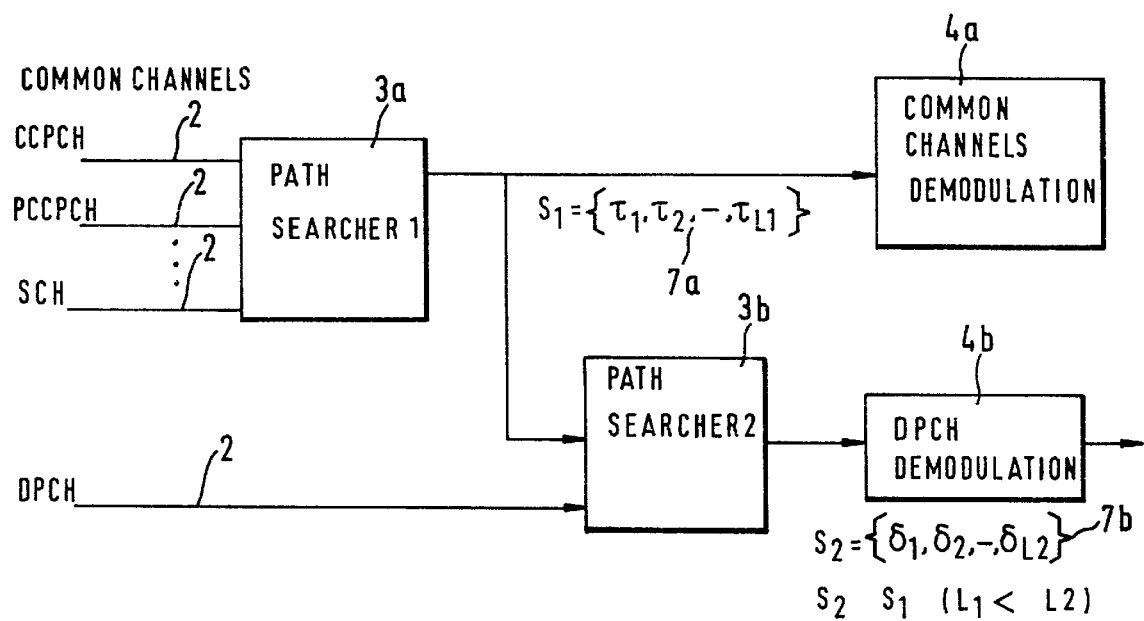

FIG. 3 Inventional cascaded structure

Figure 4:
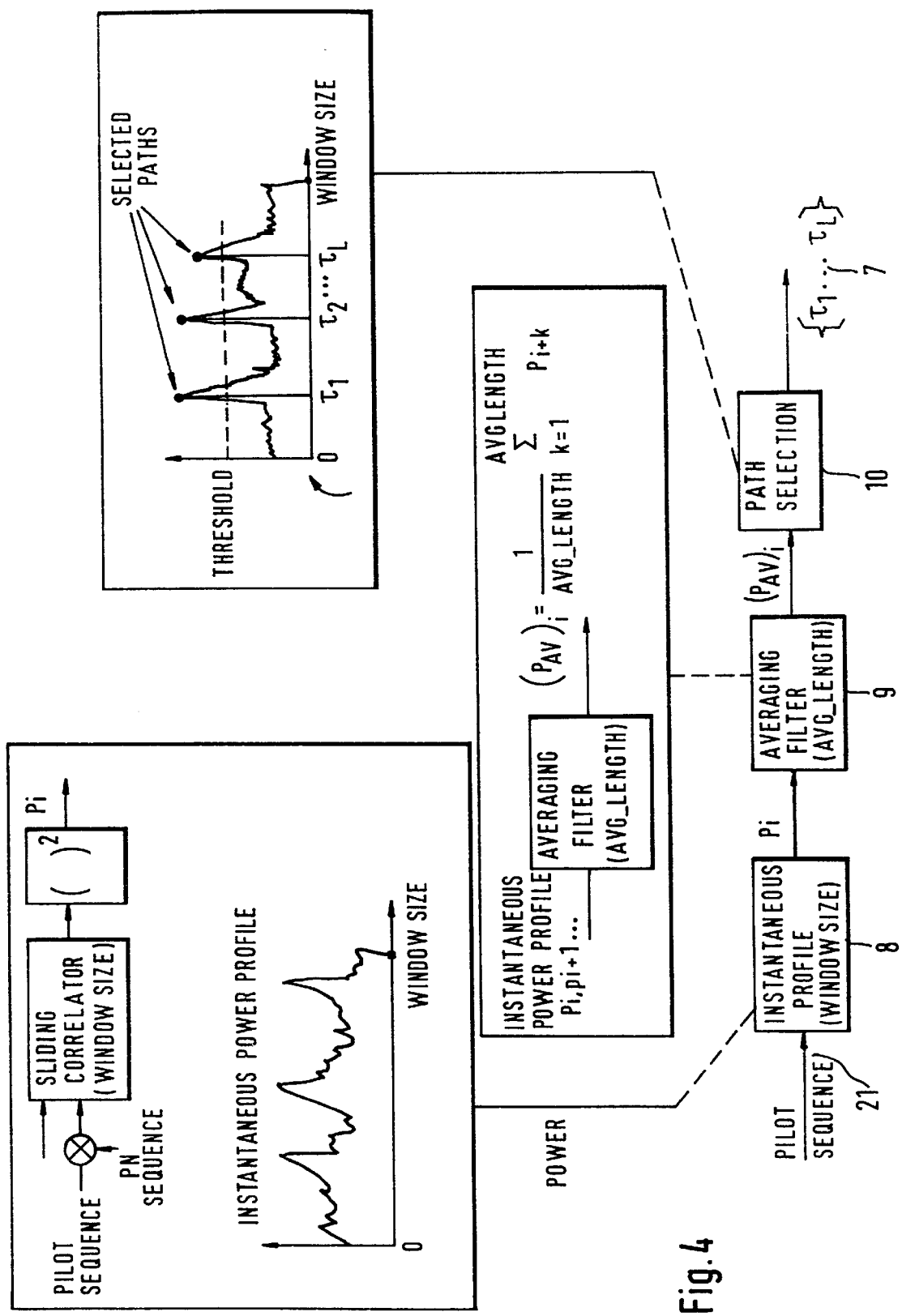

FIG. 4 Path searching method

DETAILED DESCRIPTION OF THE INVENTION

In prior art the dedicated physical channel (DPCH) and its pilot sequence is used to extract a power profile of the channels.

FIG. 1 shows the functional block diagram of a Rake receiver 1. The Rake receiver 1 is a fundamental element of the mobile station demodulator. A typical Rake receiver comprises three basic algorithms: a path searcher 3, a channel estimator 4 and a combiner 5. First, from a known pilot sequence, the path searcher 3 estimates the number and locations (time delays) 7 of the paths in a frequency selective channel. These delay estimates 7 are then used by the channel estimator 4 to get the complex coefficients Ci of the propagation channel. Finally, the combiner coherently combines the channel coefficient estimates obtained for each path to enhance the useful data signal information before detection.

The principle of the Rake receiver is to combine the maximum number of different paths, by introducing delays in the receiver. These paths and delays ($\tau_i$ is the delay of the $i^{th}$ path) ore respectively detected and estimated by the functional block called path searcher 3. The second block of the Rake receiver is the channel estimator 4, which performs the estimation of the channel impulse response over all the detected paths by the path searcher 3. These estimations are also used to combine coherently each received path. This combination of the paths is performed by the combiner 5.

The path-searcher algorithm is an important functional part in a Rake receiver. The aim of this algorithm is to estimate the number and the location of the paths in a multipath channel. These estimations are also used by the channel estimator 4 and the combiner 5. Those are connected to the path searcher 3.

To detect paths, the path searcher 3 uses the pilot sequence of the Dedicated Physical Channel and/or the CPICH common pilot channel. This pilot sequence is split on I&Q branches, spread with a Hadamord code and scrambled with a Gold code, according to the ETSI specification.

The path searcher needs a power profile prior to the path selection operation. The structure of a path searcher 3 in details is shown in FIG. 4. The path searcher comprises an instantaneous profile analyzer 8 connected to an averaging filter 9 and a path selector 10. The instantaneous profile analyzer 8 extract the energy distribution of the measured signal of the slot i of the pilot sequence 21. The result is an instantaneous power profile shown in FIG. 4 over a definite window size. To get a more reliable profile noncoherent averaging the instantaneous channel profiles performed on a slot by slot-basis is computed. The noncoherent averaging is performed over AVG_LENGTH slots by an averaging filter 9. The instantaneous profiles Pi, pi+1 ... are used. The lost step is the path selector that selected the paths with power densities above a predefined threshold. The result is a set of delays.

The basic observation is that the power delay spread experienced by the dedicated channels is a subset of the one experienced by the common channels.

To improve this path searcher performance the receiver is structured as shown in FIG. 3. There is a plurality of input signals 2 for example the DPCH, the CPICH, the PCCPCH or the SCH connected to the path searcher 3a. The path searcher 3a is linked to the further common channels demodulation 4a. It is also possible to use only one common channels as described in prior art.

The path searcher 3a has a link to the path searcher 3b which has a second input from the dedicated channel DPCH. The path searcher is linked to the DPCH demodulation 4b.

In UTRA/FDD several common physical channels are transmitted in parallel on the down link, generally with a sufficient power to be detected anywhere in the cell and with a constant rote (fixed spreading factor, except for the secondary CCPCH). Down link common channels are transmitted at a relatively higher power to be well detected by all users in a cell. Moreover most of these channels have a constant and low bit rate, meaning pilot sequences of long duration which give more accurate results , in term of correlation properties (longer size of correlation) than to have an estimation of a power profile in a variable bit rate ( variable size of correlation).

Due to better signal to noise ratio of the common channels, path delays selection con be made in a first stage for common channels. This means to select a set S1 of possible path delays based on full path searching procedure as described in the parallel patent application; applied on the common channels. In the second stage a subset S2 of the initial set S1 is retained on a reduced path searching procedure restricted to the L initially selected delays in the set S1.

This solution has the advantage that a better dedicated power profile can be obtained by the better performance of the path searcher 3b The complexity is divided by two approximately as path searcher 3b operation is now limited to pre selected L samples only.

What is claimed is:

1. Receiver for enhanced performance for CDMA radio transmission comprising a Rake receiver (1) with a path searcher (3), a channel estimator (4) and a combiner (5) for selecting optimal channels paths where the path searcher (3) selects a set of path delays (7), characterized in that at least two path searchers (3a,3b) are connected in way that the output of the first path searcher (3a) is linked to one input of the second path searcher (3b).

2. Receiver according to claim 1 characterized in that the first path searcher (3a) analyzes one common channel.

3. Receiver according to claim 1 characterized in that the first path searcher (3a) analyzes at least two common channels.

4. Method for improving path searchers in a multi path transmission to search an optimal transmission path, characterized in that more than one path searcher (3) is cascaded in such a way that a first set (S1) of path delays from a first path searcher (3a) are inputted to the second path searcher (3b) and that the second path searcher (3b) analyze a channel only in the range of the first set (S1) of path delays.

5. Method according to claim 4 characterized in that the first set of path delay S1 is greater than the second set (S2).

* * * * *